No. 732,360. Patented June 30, 1903.

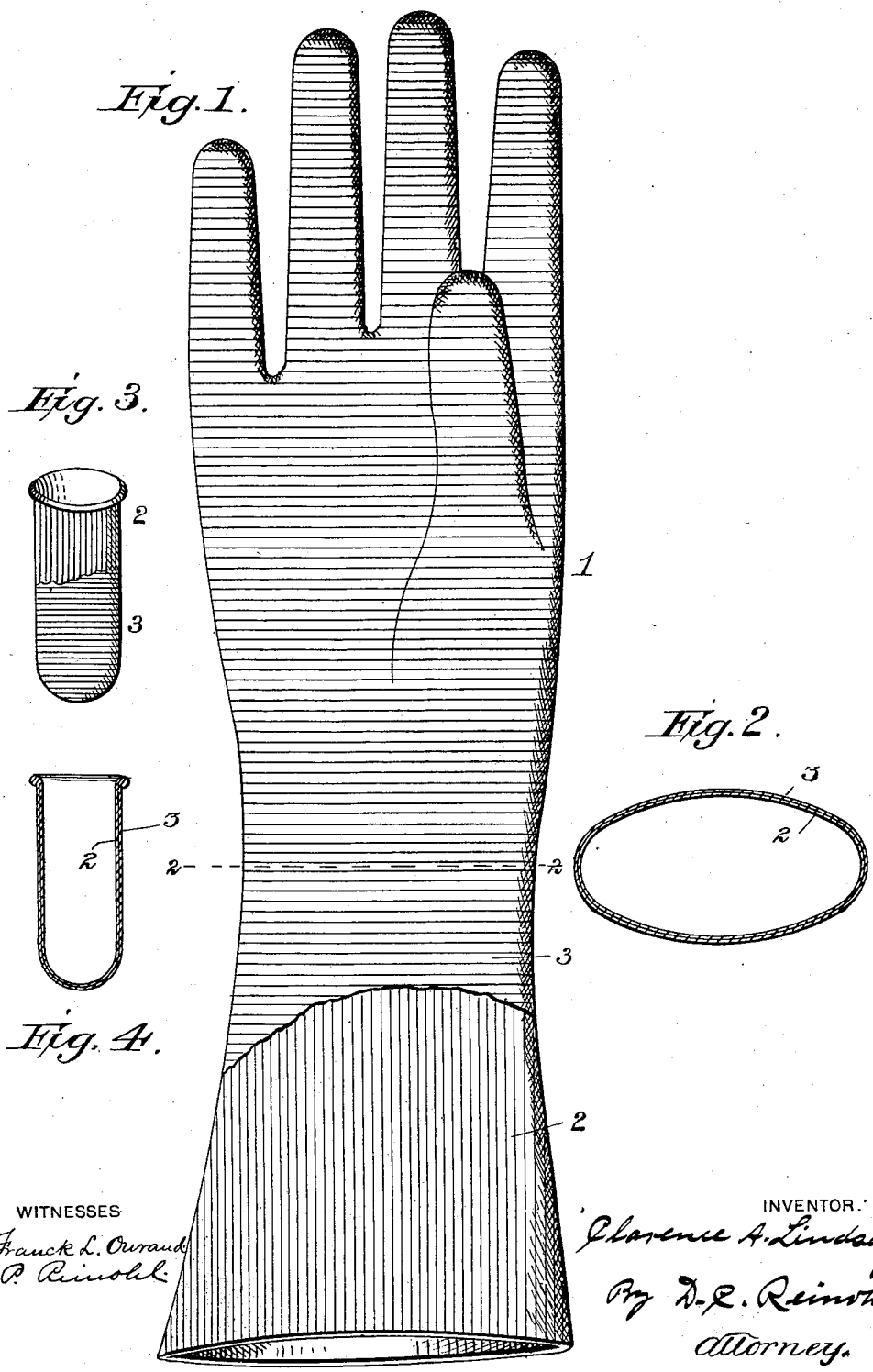

UNITED STATES PATENT OFFICE.

CLARENCE A. LINDSAY, OF NEW YORK, N. Y.

SEAMLESS RUBBER GLOVE.

SPECIFICATION forming part of Letters Patent No. 732,360, dated June 30, 1903.

Application filed April 24, 1903. Serial No. 154,103. (No model.)

*To all whom it may concern:*

Be it known that I, CLARENCE A. LINDSAY, a citizen of the United States, residing at New York city, in the county of New York and State of New York, have invented certain new and useful Improvements in Seamless Rubber Gloves; and I do hereby declare the following to be a full, clear, and exact description of the invention, such as will enable others skilled in the art to which it appertains to make and use the same.

My invention relates to seamless gloves and like molded rubber articles, and has for its object the production of an article of the kind which shall possess the elastic properties of an all rubber article, while it is given body and color to suit the taste of the user or the use to which it is to be applied.

The invention consists in certain improvements which will be fully disclosed in the following specification and claims.

Gloves made from pure rubber, such as are used for surgical purposes, are too costly and delicate for use by nurses and for household purposes. To overcome this objection, gloves have been made of a compound solution of rubber and coloring-matter, which has the effect of sacrificing the elasticity and the durability of the glove to a very great extent, while it adds so much to the thickness of the glove that it becomes a serious disadvantage to the user. By my invention a glove or other molded rubber article is made of approximately the same weight as a pure-rubber article, while it is given body and color to suit without sacrificing the elastic property or the strength of the article to any appreciable degree.

For the purpose of illustration I have selected a glove and a finger-cot; but other molded rubber articles—such as nipples, ice-bags, ice-caps, bathing-caps, balloons, and seamless specialties—may be made and are included under my invention.

In the accompanying drawings, which form part of this specification, Figure 1 represents a plan view of a glove illustrating my invention; Fig. 2, a transverse section of the same on line 2 2, Fig. 1; Fig. 3, a side elevation of a finger-cot, and Fig. 4 a vertical transverse section of the same.

Reference being had to the drawings and the designating characters thereon, 1 indicates a glove, 2 the inner or first layer or stratum of pure or high-grade rubber, possessing a high degree of elasticity, and 3 the outer or second layer or stratum of a lower grade of rubber or rubber compound possessing a lower degree of elasticity and containing any preferred coloring-matter to give body or thickness of stock of any color desired to the glove and which outer stratum is inseparably joined to the inner stratum.

In the manufacture of gloves or other molded rubber articles a form is dipped in a solution of pure or high-grade rubber, which is transparent, until the desired thickness or body is produced. The form with its initial or primary body of rubber formed thereon is then dipped into a solution of rubber and any desired coloring compound and the dipping repeated until the desired thickness of the composite body is obtained. When the said composite body is vulcanized or cured in the usual manner and by which vulcanizing or curing the strata of the composite body become inseparably joined together throughout their coincident surfaces, it then becomes a body in which the elasticity of the inner layer or stratum is not inoperatively impaired and an article is produced in which all the properties of a pure-rubber article are retained with an outer or wearing opaque surface of any preferred color.

It is obvious that for heavy articles the layers of rubber and rubber compound may be alternated and several thicknesses of each produced.

Having thus fully described my invention, what I claim is—

1. A new article of manufacture, a dipped rubber article of strata of different degrees of elasticity, said strata being inseparably adherent throughout their coincident surfaces.

2. A dipped rubber article, having a stratum of transparent rubber, and a stratum of opaque rubber inseparably adherent to each other throughout their coincident surfaces.

3. A dipped seamless rubber glove, having an inner stratum of transparent rubber, and an outer stratum of colored rubber inseparably adherent to each other throughout their coincident surfaces.

In testimony whereof I affix my signature in presence of two witnesses.

CLARENCE A. LINDSAY.

Witnesses:
PAUL GOEPEL,
H. OBERMAYER.